(12) United States Patent
Wissemeier et al.

(10) Patent No.: US 8,075,659 B2
(45) Date of Patent: Dec. 13, 2011

(54) PREPARATIONS WITH IMPROVED UREASE-INHIBITING EFFECT AND UREA-CONTAINING FERTILIZERS CONTAINING THE LATTER

(75) Inventors: Alexander Wissemeier, Speyer (DE); Patrick Deck, Mannheim (DE); Oliver Huttenloch, Ispringen (DE); Michael Mauβ, Neustadt (DE); Gregor Pasda, Neustadt (DE); Ralf-Thomas Rahn, Mannheim (DE); Wolfgang Weigelt, Dudenhofen (DE); Wolfram Zerulla, Maikammer (DE)

(73) Assignee: BASF SE, Ludwigshafen (DE)

( * ) Notice: Subject to any disclaimer, the term of this patent is extended or adjusted under 35 U.S.C. 154(b) by 582 days.

(21) Appl. No.: 12/279,566

(22) PCT Filed: Feb. 7, 2007

(86) PCT No.: PCT/EP2007/051143
§ 371 (c)(1),
(2), (4) Date: Aug. 15, 2008

(87) PCT Pub. No.: WO2007/093528
PCT Pub. Date: Aug. 23, 2007

(65) Prior Publication Data
US 2010/0218575 A1 Sep. 2, 2010

(30) Foreign Application Priority Data
Feb. 16, 2006 (EP) .................................. 06110039

(51) Int. Cl.
C05D 9/02 (2006.01)
C05C 9/00 (2006.01)
C05B 15/00 (2006.01)
C07F 9/00 (2006.01)
C07F 9/02 (2006.01)
C07F 9/28 (2006.01)

(52) U.S. Cl. .......... 71/29; 71/27; 71/28; 71/30; 71/902; 564/14; 564/15

(58) Field of Classification Search ............ 71/27–30, 71/64.01–64.13, 902; 564/14, 15, 153
See application file for complete search history.

(56) References Cited

U.S. PATENT DOCUMENTS

| 4,530,714 A | * | 7/1985 | Kolc et al. ............ 71/28 |
| 4,932,992 A | | 6/1990 | Radel |
| 5,352,265 A | * | 10/1994 | Weston et al. .......... 71/29 |
| 5,364,438 A | | 11/1994 | Weston et al. |
| 5,770,771 A | | 6/1998 | Sulzer et al. |

FOREIGN PATENT DOCUMENTS

| DE | 10317895 A1 | 11/2004 |
| EP | 0119487 A1 | 9/1984 |
| WO | WO-97/22568 A1 | 6/1997 |
| WO | WO-00/58317 A1 | 10/2000 |
| WO | WO-00/61522 A1 | 10/2000 |

OTHER PUBLICATIONS

Kiss, S., "Improving Efficiency of Urea Fertilizers by Inhibition of Soil Urease Activity", 2002, Kluwer Academic Publishers, ISBN 1-4020-0493 (7 pages).
Mobley, H. L. T., et al., "Molecular Biology of Microbial Ureases", Microbiological Reviews, 1995, pp. 451-480.
U.S. Appl. No. 11/921,611, filed Dec. 6, 2007.
U.S. Appl. No. 12/064,349, filed Sep. 15, 2008.
U.S. Appl. No. 12/063,946, filed Feb. 15, 2008.
U.S. Appl. No. 12/376,808, filed Feb. 9, 2009.
U.S. Appl. No. 12/377,215, filed Feb. 11, 2009.
U.S. Appl. No. 12/446,536, filed May 15, 2009.
U.S. Appl. No. 12/517,703, filed Jun. 4, 2009.
U.S. Appl. No. 12/526,422, filed Aug. 7, 2009.
U.S. Appl. No. 12/526,412, filed Aug. 7, 2009.
U.S. Appl. No. 12/526,404, filed Aug. 7, 2009.
U.S. Appl. No. 12/281,936, filed Sep. 5, 2008.
U.S. Appl. No. 12/282,449, filed Sep. 10, 2008.
U.S. Appl. No. 12/294,712, filed Sep. 26, 2008.
U.S. Appl. No. 12/294,813, filed Sep. 26, 2008.
U.S. Appl. No. 12/226,410, filed Oct. 17, 2008.
U.S. Appl. No. 12/373,168, filed Jan. 9, 2009.

* cited by examiner

*Primary Examiner* — Jerry A Lorengo
*Assistant Examiner* — Jennifer Smith
(74) *Attorney, Agent, or Firm* — Connolly Bove Lodge & Hutz LLP

(57) ABSTRACT

The invention relates to preparations with improved urease-inhibitory effect which comprise at least two different (thio) phosphoric triamides and to urea-comprising fertilizers which comprise these preparations. The invention furthermore relates to a method of preparing these preparations, to the use of these preparations in the fertilization with urea-comprising fertilizers, and to the use of urea-comprising fertilizers which comprise these preparations in agriculture or in horticulture.

11 Claims, No Drawings

PREPARATIONS WITH IMPROVED UREASE-INHIBITING EFFECT AND UREA-CONTAINING FERTILIZERS CONTAINING THE LATTER

RELATED APPLICATIONS

This application is a national stage application (under 35 U.S.C. §371) of PCT/EP2007/051143, filed Feb. 7, 2007, which claims benefit of European application 06110039.2, filed Feb. 16, 2006.

The invention relates to preparations with improved urease-inhibitory effect which comprise at least two different (thio)phosphoric triamides and to urea-comprising fertilizers which comprise these preparations. The invention furthermore relates to a method of preparing these preparations, to the use of these preparations in the fertilization with urea-comprising fertilizers, and to the use of urea-comprising fertilizers which comprise these preparations in agriculture or in horticulture.

The vast majority of the nitrogen which is used for fertilization purposes is globally employed in the form of urea or urea-comprising fertilizers, and its use is on the increase. Urea itself, however, is a form of nitrogen which is barely taken up, or not at all, since it is relatively rapidly hydrolyzed in the soil by the ubiquitar enzyme urease to give ammonia and carbon dioxide (Mobley, H. L. T., Island, M. D., Hausinger, R. P. (1995) Molecular biology of microbial ureases, Microbiol. Rev. 59, 452-480). During this process, gaseous ammonia may be released into the atmosphere and is then no longer available in the soil for the plants, thus reducing the efficacy of the fertilization.

It is known that the nitrogen utilization when employing urea-comprising fertilizers can be improved by applying urea-comprising fertilizers concomitantly with substances which are capable of reducing or inhibiting the enzymatic cleavage of urea (Kiss, S., Simihǎian, M. (2002) Improving Efficiency of Urea Fertilizers by Inhibition of Soil Urease Activity, ISBN 1-4020-0493-1, Kluwer Academic Publishers, Dordrecht, The Netherlands). The most potent known urease inhibitors include N-alkylthiophosphoric triamides and N-alkylphosphoric triamides, which are described, for example, in EP 0 119 487. To date, a large-scale application of these urease inhibitors has been limited by production costs, which are relatively high, and/or by the fact that the application rates required were unduly high.

It was an object of the invention to improve the nitrogen utilization when employing urease inhibitors in the fertilization with urea or urea-comprising fertilizers. It was a further object to reduce the required application rates of urease inhibitors.

Surprisingly, it has now been found that the use of preparations which comprise at least two different (thio)phosphoric triamides allows a greater limitation of the gaseous ammonia losses after the application of urea or urea-comprising fertilizers than when the same amount of a single (thio)phosphoric triamide is applied. The object is accordingly achieved by preparations with improved urease-inhibitory effect, which comprise at least two different (thio)phosphoric triamides.

The invention thus relates to a preparation comprising at least two different (thio)phosphoric triamides having structures according to the general formula (I)

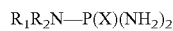

$$R_1R_2N\text{---}P(X)(NH_2)_2 \quad (I)$$

in which
X is oxygen or sulfur, $R_1$ is a $C_1$-$C_{10}$-alkyl, $C_3$-$C_{10}$-cycloalkyl, $C_6$-$C_{10}$-aryl or dialkylaminocarbonyl group and $R_2$ is hydrogen, or $R_1$ and $R_2$ together with the nitrogen atom linking them form a 5- or 6-membered saturated or unsaturated heterocyclic radical, which can optionally also comprise 1 or 2 further heteroatoms selected from the group consisting of nitrogen, oxygen and sulfur, which (thio)phosphoric triamides differ in at least one of the radicals $R_1$ or $R_2$.

Examples of alkyl groups are methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl and isodecyl. Examples of cycloalkyl groups are cyclopropyl, cyclobutyl, cyclopentyl, cyclohexyl and cyclooctyl, examples of aryl groups are phenyl or naphthyl. Examples of heterocyclic radicals $R_1R_2N$— are piperazinyl, morpholinyl, pyrrolyl, pyrazolyl, triazolyl, oxazolyl, thiazolyl or imidazolyl groups.

Such compounds are known as urease inhibitors for example from EP 0 119 487, WO 00/58317 and EP 1 183 220.

Especially preferred are N-alkylthiophosphoric triamides (where X=S and $R_2$=H) and N-alkylphosphoric triamides (where X=O and $R_2$=H).

The preparation of such urease inhibitors can be accomplished for example by known methods starting from thiophosphoryl chloride, primary or secondary amines and ammonia, as described, for example, in U.S. Pat. No. 5,770,771. In a first step, thiophosphoryl chloride is reacted with one equivalent of a primary or secondary amine in the presence of a base, and the product is subsequently reacted with an excess of ammonia to give the end product.

The preparations according to the invention comprise at least two different derivatives of the general formula (I) which must differ in at least one of the radicals $R_1$ or $R_2$. For example, a preparation according to the invention comprises the active substances N-n-butylthiophosphoric triamide (NBTPT) and N-n-propylthiophosphoric triamide (NPTPT). Each individual active substance accounts for amounts of at least 0.01% by weight and at most 99.99% by weight, based on the total amount of active substance in the preparation. By preference, the individual active substances account for amounts of from 20 to 40% by weight, or 60 to 80% by weight, respectively.

Preferred preparations are those which comprise N-n-butylthiophosphoric triamide (NBTPT) as one of the active substances. The at least one further active substance is preferably a derivative selected from the group consisting of N-cyclohexyl-, N-pentyl-, N-isobutyl- and N-propylphosphoric triamide and -thiophosphoric triamide. Especially preferred are those preparations which comprise NBTPT in amounts of from 40 to 95% by weight, very especially preferably from 60 to 80% by weight, in each case based on the total amount of active substance.

As is known, thiophosphoric triamides are hydrolyzed with relative ease to give the corresponding phosphoric triamides. Since, as a rule, moisture cannot be eliminated completely, thiophosphoric triamide and the corresponding phosphoric triamide are frequently present as a mixture with one another. In the present publication, the term "(thio)phosphoric triamide" therefore refers not only to the pure thiophosphoric triamides or phosphoric triamides, but also to their mixtures.

The preparations according to the invention can consist either of the pure active substance mixtures or else be present in the form of liquid or solid formulations. Liquid formulations can additionally comprise solvents such as water, alcohols, glycols or amines or their mixtures in amounts of from approximately 1 to approximately 80% by weight, in addition to the active substance mixture. Examples of suitable liquid formulations of (thio)phosphoric triamides can be found in WO 97/22568, which is referred to in its entirety. Solid formulations may additionally comprise additives such as fillers, binders or granulation auxiliaries, for example lime, gypsum, silicon dioxide or kaolinite, in amounts from approximately 1 to approximately 95% by weight, in addition to the active substance mixture. Besides the active substance mixture, preparations according to the invention can simultaneously also comprise solvents or solvent mixtures and additives and can be present in the form of a suspension.

The preparations according to the invention, which comprise at least two different (thio)phosphoric triamides, can be prepared for example by mixing two or more individual active substances which have been synthesized separately. Another possibility is to employ, in the first step of the above-described synthesis, a mixture of at least two primary and/or secondary amines so that after reaction with ammonia in the second step the product obtained is directly a mixture of at least two (thio)phosphoric triamides. The invention therefore furthermore relates to a method of preparing preparations with improved urease-inhibitory effect, either by mixing at least two (thio)phosphoric triamides which have been synthesized separately, or by reacting thiophosphoryl chloride with a mixture of at least two different primary and/or secondary amines and subsequently with ammonia, thereby a product with the composition according to the invention is obtained directly. Thus, reacting a mixture of, foe example, two primary amines such as n-butylamine and n-propylamine with thiophosphoryl chloride and subsequently with ammonia allows a mixture of NBTPT and NPTPT to be obtained directly. The resulting quantitative ratio of the two products generally corresponds to that of the amines employed, provided that the reaction rates of the two amines are comparable.

The invention furthermore relates to a urea-comprising fertilizer which comprises a preparation according to the invention comprising at least two different (thio)phosphoric triamides having structures according to the general formula (I).

First and foremost, a urea-comprising fertilizer is understood as meaning urea itself. Urea in the fertilizer quality of the market has a purity of at least 90% and can be for example in crystalline, granulated, compacted, prilled or ground form. In addition, mixtures of urea with one or more further nitrogen fertilizers such as ammonium sulfate, ammonium nitrate, ammonium chloride, cyanamide, dicyandiamide or calcium nitrate and slow-release-fertilizers, for example urea/formaldehyde, urea/acetaldehyde or urea/glyoxal condensates should also be comprised. Also comprised are urea-comprising multinutrient fertilizers which, in addition to nitrogen, comprise at least one further nutrient such as phosphorus, potassium, magnesium, calcium or sulfur. In addition, the trace elements boron, iron, copper, zinc, manganese or molybdenum may also be present. Such urea-comprising multinutrient fertilizers can likewise be in granulated, compacted, prilled or ground form or in the form of a crystal mixture. Additionally comprised are liquid urea-comprising fertilizers such as ammonium nitrate/urea solution, or else liquid manure. The urea-comprising fertilizers can additionally also comprise one or more further active substances such as, for example, nitrification inhibitors, herbicides, fungicides, insecticides, growth regulators, hormones, pheromones or other plant protection agents or soil adjuvants in amounts of from 0.01 to 20% by weight.

The fertilizers according to the invention are obtainable by mixing at least two different (thio)phosphoric triamides separately, or the preparations comprising at least two different (thio)phosphoric triamides, either in liquid or else in solid form with the urea-comprising fertilizers or by granulating, compacting or prilling the former into the latter by adding them to a suitable fertilizer mixture or a mash or melt. In addition, the at least two different (thio)phosphoric triamides, or the preparations comprising at least two different (thio) phosphoric triamides can also be applied to the surface to finished granules, compactates or prills of the urea-comprising fertilizers, for example by spraying on, dusting on or impregnating. This can also be accomplished using further adjuvants such as adhesives or coating materials. Suitable apparatuses for performing this application are, for example, plates, drums, mixers or fluidized-bed apparatuses; however, the application can also be accomplished on conveyor belts or their discharge points or by means of pneumatic conveyors of solids.

The total amount of (thio)phosphoric triamides present in the fertilizers according to the invention is, as a rule, between 0.001 and 0.5% by weight, preferably in the range of between 0.01 and 0.3% by weight, especially preferably between 0.02 and 0.2% by weight, in each case based on the urea present.

The invention furthermore relates to the use of these preparations which comprise at least two different (thio)phosphoric triamides in the fertilization with urea-comprising fertilizers. This use can be accomplished not only by using the above-described urea-comprising fertilizers which comprise at least two different (thio)phosphoric triamides, but also by the separate application of the preparations according to the invention on an agricultural or horticultural area before or after the use of suitable urea-comprising fertilizers. In addition, the preparations according to the invention can also be used as an addition to liquid manure or for the treatment of, for example, animal houses or enclosures, such as for the purposes of odor reduction.

The invention furthermore relates to the use of urea-comprising fertilizers which comprise a preparation comprising at least two different (thio)phosphoric triamides having structures according to the general formula (I) in agriculture or in horticulture.

The examples which follow are intended to illustrate the invention in greater detail.

EXAMPLES

The efficacy of the (thio)phosphoric triamides, individually and in combination, was tested by a method based on that of Fenn & Kissel ((1973) Ammonia volatilization from surface applications of ammonium compounds on calcareous soils. Soil Sci. Soc. Am. J. 37, 855-859) for their effect in limiting ammonia volatilization from urea or urea-comprising fertilizers. Three different soils in which ammonia volatilization after urea fertilization is particularly pronounced were used. These soils are distinguished by relatively high pH values of >6.5 and/or low base buffering. Low base buffering causes the pH of the soil solution to be increased around the urea granule as the result of the nascent ammonia in equilibrium with the formation of ammonium hydroxide, and this phenomenon, in turn, shifts the equilibrium between $NH_3+H_2O \leftrightarrow NH_4^+ +OH^-$ in favor of the gaseous ammonia. 200 g of dry soil per incubation vessel were moistened with 5.4 ml of fully demineralized water, and 1.087 g of urea (corresponds to 500 mg of urea-N) were applied in the form of granules. If urea-comprising solutions were tested, the 200 g of soil were moistened with an aqueous urea-comprising solution comprising 1.630 g of urea (corresponds to 750 mg of urea-N), without or with urease inhibitor or combinations of these. The solution was applied dropwise over the entire soil surface, using a pipette. The amount of (thio)phosphoric triamides as individual substances or in combination in different proportions was always a uniform 0.125% (w/w) based on urea. The incubations were accomplished at 20° C. (18-22° C.) in a controlled-environment cabinet. The ammonia collected in the acid trap was determined quantitatively as ammonium using a continuous flow analyzer (from Bran+Luebbe), proceeding by methods with which the skilled worker is familiar.

Soil Characteristics:

| Soil | pH (CaCl$_2$) | Particle size distribution | | | organic matter |
|---|---|---|---|---|---|
| | | % sand | % silt | % clay | % carbon |
| Limburgerhof | 6.8 | 73 | 16 | 11 | <1 |
| Hanover | 7.5 | 32 | 47 | 20 | 1 |
| France | 7.6 | 31 | 23 | 36 | 10 |

Results:

Tables 1 to 4 show the NH$_3$ losses after 10 days' incubation of granulated urea without and with addition of (thio)phosphoric triamides individually and in combination, in each case with NBTPT. It can be seen that the activity of NBTPT is markedly improved when 20 to 40 parts by weight of NBTPT are replaced by NcHTPT, NPenTPT, NiBTPT or NPTPT.

Tables 4, 9 and 10 show the results for the analogous studies with the active substance combination NBTPT and NPTPT on three different soils. The improved activity of the combination according to the invention can be seen on all three soils.

Tables 5 to 8 represent the results of the analogous studies with urea solution. It can be seen that the level of the ammonia losses without urease inhibitor is lower than in the case of granulated urea and, depending on the test series, corresponds to around 11 to 28% of the amount of nitrogen fertilized in the form of urea, while they amounted to approximately 39% in the case of granulated urea. This can be explained by the urea solution having penetrated the soil, where the negatively charged soil particles have removed more ammonium ions from the NH$_3 \leftrightarrow$NH$_4^+$ equilibrium. A further factor which determines the extent of the ammonia losses is air movement. Again, this is less in the soil than on the soil surface.

Again, the activity pattern among the (thio)phosphoric triamides and the particular efficacy of limiting ammonia losses even from a solution when between 20 and 40% by weight of the amount of NBTPT are replaced by NPenTPT, NiBTPT or NPTPT could be observed here.

Tables 11 and 12 show the results of comparative experiments with the noninventive active substance combinations of NBTPT and N,N-di-n-butylthiophosphoric triamide (Table 11) or NBTPT and N,N-diisobutylthiophosphoric triamide (Table 12). These mixtures resulted in no improved activity.

TABLE 1

Nitrogen volatilization after 10 days' incubation of granulated urea without and with addition of the urease inhibitors NBTPT and N-cyclohexylthiophosphoric triamide (NcHTPT) and their combination on Limburgerhof soil

| Relative weight proportions NBTPT | Relative weight proportions NcHTPT | % N loss based on fertilized N quantity | % N loss relative to NBTPT without mixing partner | % N loss relative to NcHTPT without mixing partner |
|---|---|---|---|---|
| 0 | 0 | 39.40 | — | — |
| 100 | 0 | 1.54 | 100 | 56 |
| 80 | 20 | 1.01 | 66 | 36 |
| 70 | 30 | 1.04 | 67 | 38 |
| 60 | 40 | 1.06 | 69 | 38 |
| 0 | 100 | 2.77 | 180 | 100 |

TABLE 2

Nitrogen volatilization after 10 days' incubation of granulated urea without and with addition of the urease inhibitors NBTPT and N-pentylthiophosphoric triamide (NPenTPT) and their combination on Limburgerhof soil

| Relative weight proportions NBTPT | Relative weight proportions NPenTPT | % N loss based on fertilized N quantity | % N loss relative to NBTPT without mixing partner | % N loss relative to NPenTPT without mixing partner |
|---|---|---|---|---|
| 0 | 0 | 39.40 | — | — |
| 100 | 0 | 1.54 | 100 | 63 |
| 80 | 20 | 1.04 | 68 | 42 |
| 70 | 30 | 0.80 | 52 | 33 |
| 60 | 40 | 1.04 | 68 | 42 |
| 0 | 100 | 2.46 | 130 | 100 |

TABLE 3

Nitrogen volatilization after 10 days' incubation of granulated urea without and with addition of the urease inhibitors NBTPT and N-isobutylthiophosphoric triamide (NiBTPT) and their combination on Limburgerhof soil

| Relative weight proportions NBTPT | Relative weight proportions NiBTPT | % N loss based on fertilized N quantity | % N loss relative to NBTPT without mixing partner | % N loss relative to NiBTPT without mixing partner |
|---|---|---|---|---|
| 0 | 0 | 39.40 | — | — |
| 100 | 0 | 1.54 | 100 | 92 |
| 80 | 20 | 1.28 | 83 | 76 |
| 70 | 30 | 1.08 | 70 | 64 |
| 60 | 40 | 1.50 | 97 | 89 |
| 0 | 100 | 1.68 | 109 | 100 |

TABLE 4

Nitrogen volatilization after 10 days' incubation of granulated urea without and with addition of the urease inhibitors NBTPT and N-propylthiophosphoric triamide (NPTPT) and their combination on Limburgerhof soil

| Relative weight proportions NBTPT | Relative weight proportions NPTPT | % N loss based on fertilized N quantity | % N loss relative to NBTPT without mixing partner | % N loss relative to NPTPT without mixing partner |
|---|---|---|---|---|
| 0 | 0 | 39.40 | — | — |
| 100 | 0 | 1.54 | 100 | 96 |
| 80 | 20 | 0.97 | 63 | 61 |
| 70 | 30 | 0.96 | 62 | 60 |
| 60 | 40 | 0.95 | 62 | 59 |
| 0 | 100 | 1.60 | 104 | 100 |

TABLE 5

Nitrogen volatilization after 10 days' incubation of 30% strength urea solution without and with addition of the urease inhibitors NBTPT and NcHTPT and their combination on Limburgerhof soil

| Relative weight proportions NBTPT | Relative weight proportions NcHTPT | % N loss based on fertilized N quantity | % N loss relative to NBTPT without mixing partner | % N loss relative to NcHTPT without mixing partner |
|---|---|---|---|---|
| 0 | 0 | 28.2 | — | — |
| 100 | 0 | 0.69 | 100 | 62 |
| 80 | 20 | 0.60 | 87 | 54 |
| 70 | 30 | 0.59 | 85 | 53 |
| 60 | 40 | 0.60 | 87 | 54 |
| 0 | 100 | 1.11 | 160 | 100 |

TABLE 6

Nitrogen volatilization after 10 days' incubation of 30% strength urea solution without and with addition of the urease inhibitors NBTPT and NPenTPT and their combination on Limburgerhof soil

| Relative weight proportions NBTPT | Relative weight proportions NPenTPT | % N loss based on fertilized N quantity | % N loss relative to NBTPT without mixing partner | % N loss relative to NPenTPT without mixing partner |
|---|---|---|---|---|
| 0 | 0 | 28.12 | — | — |
| 100 | 0 | 0.71 | 100 | 63 |
| 80 | 20 | 0.55 | 77 | 49 |
| 70 | 30 | 0.61 | 86 | 54 |
| 60 | 40 | 0.58 | 82 | 52 |
| 0 | 100 | 1.12 | 158 | 100 |

TABLE 7

Nitrogen volatilization after 10 days' incubation of 30% strength urea solution without and with addition of the urease inhibitors NBTPT and NiBTPT and their combination on Limburgerhof soil

| Relative weight proportions NBTPT | Relative weight proportions NiBTPT | % N loss based on fertilized N quantity | % N loss relative to NBTPT without mixing partner | % N loss relative to NiBTPT without mixing partner |
|---|---|---|---|---|
| 0 | 0 | 10.65 | — | — |
| 100 | 0 | 0.33 | 100 | 61 |
| 80 | 20 | 0.25 | 76 | 46 |
| 70 | 30 | 0.25 | 76 | 46 |
| 60 | 40 | 0.29 | 88 | 54 |
| 0 | 100 | 0.54 | 164 | 100 |

TABLE 8

Nitrogen volatilization after 10 days' incubation of 30% strength urea solution without and with addition of the urease inhibitors NBTPT and NPTPT and their combination on Limburgerhof soil

| Relative weight proportions NBTPT | Relative weight proportions NPTPT | % N loss based on fertilized N quantity | % N loss relative to NBTPT without mixing partner | % N loss relative to NPTPT without mixing partner |
|---|---|---|---|---|
| 0 | 0 | 10.65 | — | — |
| 100 | 0 | 0.33 | 100 | 79 |
| 80 | 20 | 0.24 | 73 | 57 |
| 70 | 30 | 0.23 | 70 | 55 |
| 60 | 40 | 0.30 | 91 | 71 |
| 0 | 100 | 0.42 | 127 | 100 |

TABLE 9

Nitrogen volatilization after 10 days' incubation of granulated urea without and with addition of the urease inhibitors NBTPT and NPTPT and their combination on soil in Hanover

| Relative weight proportions NBTPT | Relative weight proportions NPTPT | % N loss based on fertilized N quantity | % N loss relative to NBTPT without mixing partner | % N loss relative to NPTPT without mixing partner |
|---|---|---|---|---|
| 0 | 0 | 46.44 | — | — |
| 100 | 0 | 1.32 | 100 | 63 |
| 80 | 20 | 0.89 | 67 | 43 |
| 70 | 30 | 0.83 | 63 | 40 |
| 60 | 40 | 1.05 | 80 | 50 |
| 0 | 100 | 2.08 | 158 | 100 |

TABLE 10

Nitrogen volatilization after 10 days' incubation of granulated urea without and with addition of the urease inhibitors NBTPT and NPTPT and their combination on soil in France

| Relative weight proportions NBTPT | Relative weight proportions NPTPT | % N loss based on fertilized N quantity | % N loss relative to NBTPT without mixing partner | % N loss relative to NPTPT without mixing partner |
|---|---|---|---|---|
| 0 | 0 | 48.43 | — | — |
| 100 | 0 | 1.30 | 100 | 83 |
| 80 | 20 | 0.73 | 56 | 46 |

TABLE 10-continued

Nitrogen volatilization after 10 days' incubation of granulated urea without and with addition of the urease inhibitors NBTPT and NPTPT and their combination on soil in France

| Relative weight proportions NBTPT | Relative weight proportions NPTPT | % N loss based on fertilized N quantity | % N loss relative to NBTPT without mixing partner | % N loss relative to NPTPT without mixing partner |
|---|---|---|---|---|
| 70 | 30 | 1.01 | 78 | 64 |
| 60 | 40 | 1.18 | 91 | 75 |
| 0 | 100 | 1.57 | 121 | 100 |

TABLE 11

Nitrogen volatilization after 10 days' incubation of 30% strength urea solution without and with addition of the urease inhibitors NBTPT and N,N-di-n-butylthiophosphoric triamide (NNDBTPT) and their combination on Limburgerhof soil

| Relative weight proportions NBTPT | Relative weight proportions NNDBTPT | % N loss based on fertilized N quantity | % N loss relative to NBTPT without mixing partner | % N loss relative to NNDBTPT without mixing partner |
|---|---|---|---|---|
| 0 | 0 | 23.10 | — | — |
| 100 | 0 | 1.90 | 100 | 10 |
| 80 | 20 | 2.07 | 109 | 11 |
| 70 | 30 | 2.55 | 134 | 13 |
| 60 | 40 | 2.65 | 139 | 14 |
| 0 | 100 | 19.24 | 1013 | 100 |

TABLE 12

Nitrogen volatilization after 10 days' incubation of 30% strength urea solution without and with addition of the urease inhibitors NBTPT and N,N-di-isobutylthiophosphoric triamide (NNDiBTPT) and their combination on Limburgerhof soil

| Relative weight proportions NBTPT | Relative weight proportions NNDiBTPT | % N loss based on fertilized N quantity | % N loss relative to NBTPT without mixing partner | % N loss relative to NNDiTPT without mixing partner |
|---|---|---|---|---|
| 0 | 0 | 23.10 | — | — |
| 100 | 0 | 1.90 | 100 | 9 |
| 80 | 20 | 1.95 | 103 | 9 |
| 70 | 30 | 2.33 | 123 | 11 |
| 60 | 40 | 2.62 | 138 | 12 |
| 0 | 100 | 21.83 | 1149 | 100 |

We claim:

1. A preparation comprising at least two different (thio) phosphoric triamides having structures of general formula (I)

$$R_1R_2N-P(X)(NH_2)_2 \quad (I)$$

wherein
X is oxygen or sulfur;
$R_1$ is a $C_1$-$C_{10}$-alkyl, $C_3$-$C_{10}$-cycloalkyl, $C_6$-$C_{10}$-aryl, or dialkylaminocarbonyl group; and
$R_2$ is hydrogen, or
$R_1$ and $R_2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
wherein said at least two different (thio)phosphoric triamides differ in at least one of radicals $R_1$ or $R_2$ and
wherein a first (thio)phosphoric triamide from among the at least two different (thio)phosphoric triamides accounts for an amount of from 20 to 40% by weight and a second (thio)phosphoric triamide from among the at least two different (thio)phosphoric triamides accounts for an amount of from 60 to 80% by weight, respectively, based on the total weight of all (thio) phosphoric triamides present.

2. The preparation of claim 1, wherein one of said at least two different (thio)phosphoric triamides is an N-alkyl(thio) phosphoric triamide and/or N-alkylphosphoric triamide.

3. The preparation of claim 1, wherein one of said at least two different (thio)phosphoric triamides is N-n-butylthiophosphoric triamide.

4. The preparation of claim 3, further comprising at least one derivative selected from the group consisting of N-cyclohexylphosphoric triamide, N-pentylphosphoric triamide, N-isobutylphosphoric triamide, N-propylphosphoric triamide, N-cyclohexylthiophosphoric triamide, N-pentylthiophosphoric triamide, N-isobutyl thiophosphoric triamide, and N-propylthiophosphoric triamide.

5. A preparation comprising at least two different (thio) phosphoric triamides,
wherein one of said at least two different (thio)phosphoric triamides is N-n-butylthiophosphoric triamide,
further comprising at least one derivative selected from the group consisting of N-cyclohexylphosphoric triamide, N-pentylphosphoric triamide, N-isobutylphosphoric triamide, N-propylphosphoric triamide, N-cyclohexylthiophosphoric triamide, N-pintylthiophosphoric triamide, N-isobutyl thiophosphoric triamide, and N-propylthiophosphoric triamide, and
wherein said N-n-butylthiophosphoric triamide is present in an amount in the range of from 40 to 95% by weight based on the total weight of all phosphoric triamides and/or thiophosphoric triamides present in said preparation.

6. A fertilizer comprising urea and the preparation of claim 1.

7. A fertilizer comprising urea and the preparation of claim 4.

8. The fertilizer of claim 7, wherein said phosphoric triamides and/or thiophosphoric triamides are present in an amount in the range of from 0.001 and 0.5% by weight based on the weight of the urea.

9. A fertilizer comprising urea and the preparation of claim 5.

10. The fertilizer of claim 9, wherein said phosphoric triamides and/or thiophosphoric triamides are present in an amount in the range of from 0.001 and 0.5% by weight based on the weight of the urea.

11. A method of preparing the preparation of claim 1, comprising reacting thiophosphoryl chloride first with a mixture of a first primary or secondary amine and a second primary or secondary amine and subsequently with ammonia.